(12) United States Patent
Tashiro et al.

(10) Patent No.: US 8,446,496 B2
(45) Date of Patent: May 21, 2013

(54) KNEE CORRECTION DEVICE AND KNEE CORRECTION METHOD

(75) Inventors: Kei Tashiro, Ome (JP); Akihiko Kubota, Ome (JP); Yoshiyuki Niijima, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 290 days.

(21) Appl. No.: 12/968,122

(22) Filed: Dec. 14, 2010

(65) Prior Publication Data

US 2011/0292256 A1    Dec. 1, 2011

(30) Foreign Application Priority Data

May 31, 2010    (JP) .................................. 2010-125128

(51) Int. Cl.
*H04N 9/64* (2006.01)
*H04N 9/69* (2006.01)
*H04N 9/73* (2006.01)
*H04N 9/68* (2006.01)

(52) U.S. Cl.
USPC ......... 348/242; 348/675; 348/223.1; 348/234

(58) Field of Classification Search
USPC ............................... 348/242, 675, 223.1, 234
See application file for complete search history.

(56) References Cited

U.S. PATENT DOCUMENTS

| | | | |
|---|---|---|---|
| 7,580,081 B2 | 8/2009 | Tamano et al. | |
| 2006/0158565 A1 | 7/2006 | Miyazawa et al. | |
| 2006/0227064 A1 | 10/2006 | Tamano et al. | |
| 2007/0024759 A1* | 2/2007 | Miyazawa | 348/675 |

FOREIGN PATENT DOCUMENTS

| | | |
|---|---|---|
| JP | 02-33265 | 2/1990 |
| JP | 07-143516 | 6/1995 |
| JP | 08-088863 | 4/1996 |
| JP | 08-256344 | 10/1996 |
| JP | 2002-064839 | 2/2002 |
| JP | 2003-224860 | 8/2003 |
| JP | 2003-333613 | 11/2003 |
| JP | 2006-148368 | 6/2006 |
| JP | 2006-179978 | 7/2006 |
| JP | 2006-295377 | 10/2006 |

OTHER PUBLICATIONS

Japanese Patent Application No. 2010-125128; Notice of Reasons for Rejection; Mailed Apr. 5, 2011 (with English translation).
Japanese Patent Application No. 2010-125128; Notice of Reasons for Rejection; Mailed Nov. 15, 2011 (with English translation).

* cited by examiner

*Primary Examiner* — Roberto Velez
*Assistant Examiner* — Joel Fosselman
(74) *Attorney, Agent, or Firm* — Blakely, Sokoloff, Taylor & Zafman LLP

(57) ABSTRACT

According to one embodiment, a knee correction device includes a generator, a detector, a mixer, and a calculator. The generator generates a luminance signal from R, G, and B color signals. The detector detects a color signal having a maximum value among the R, G, and B color signals. The mixer mixes the luminance signal generated by the generator and the color signal detected by the detector, at a predetermined mixing ratio. The supply module supplies a coefficient for performing level compression on each of the R, G, and B color signals, based on an output of the mixer. The calculator performs level compression on the R, G, and B color signals by subjecting the coefficient supplied by the supply module and the R, G, and B color signals to a calculation.

6 Claims, 9 Drawing Sheets

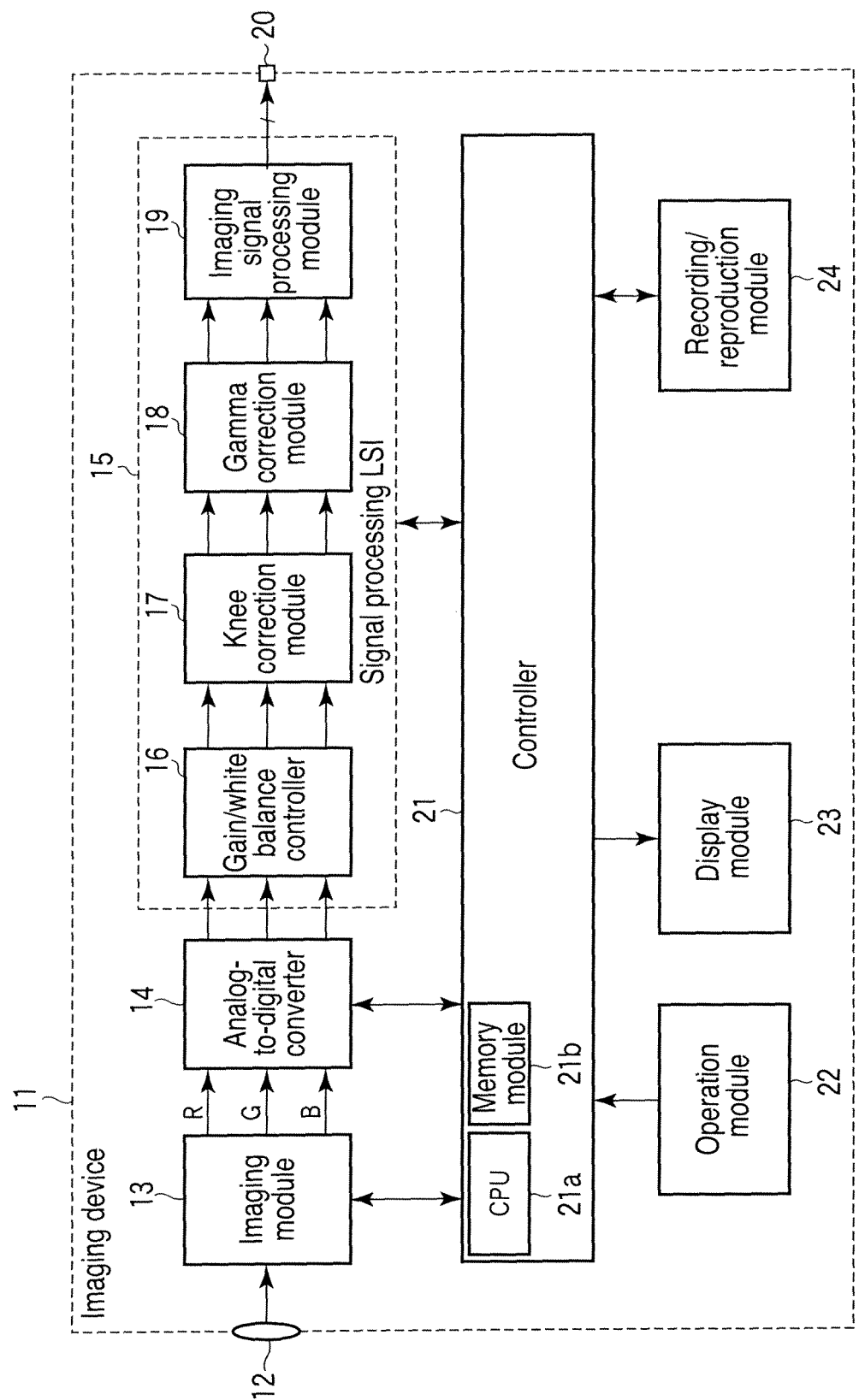
F I G. 1

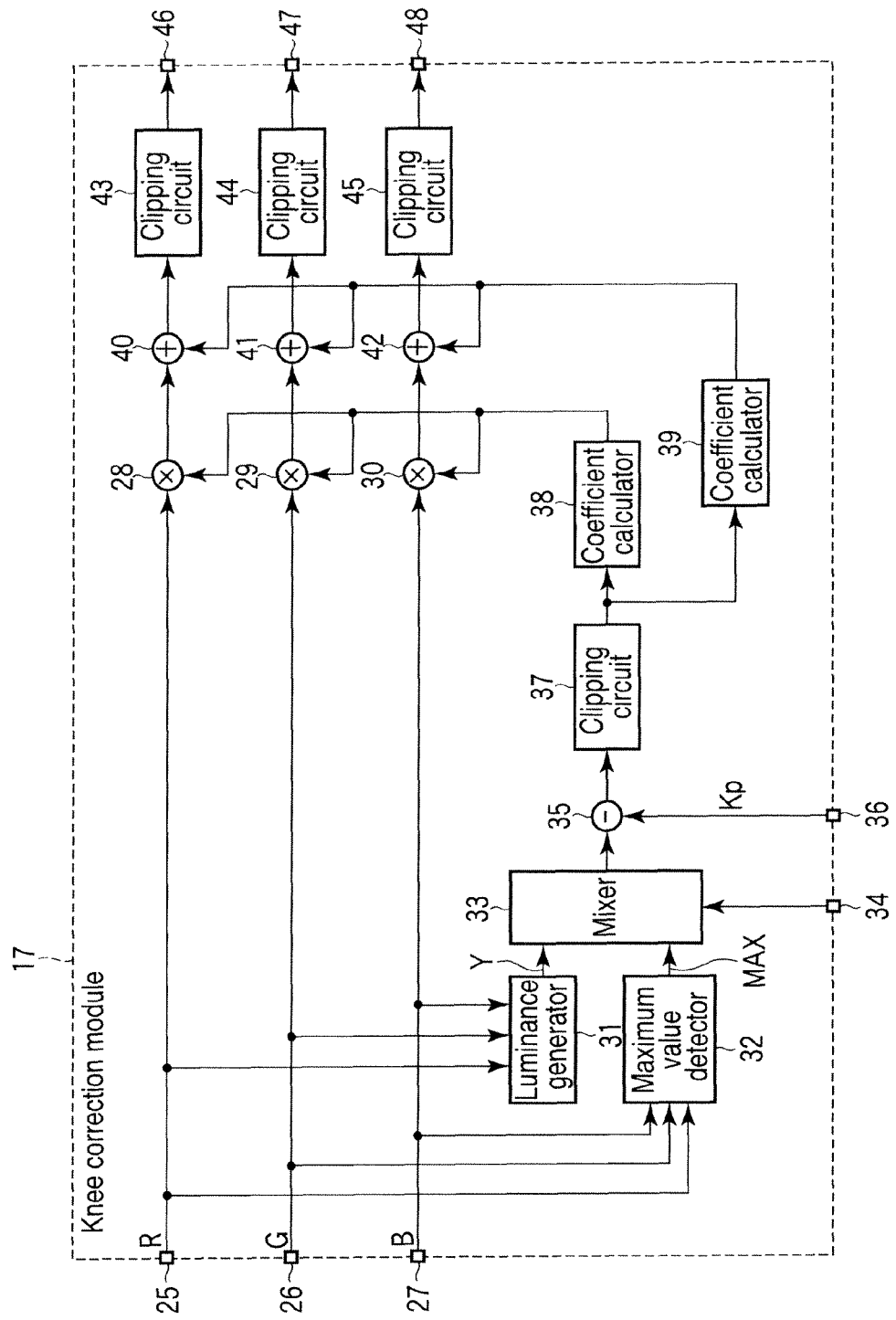
F I G. 2

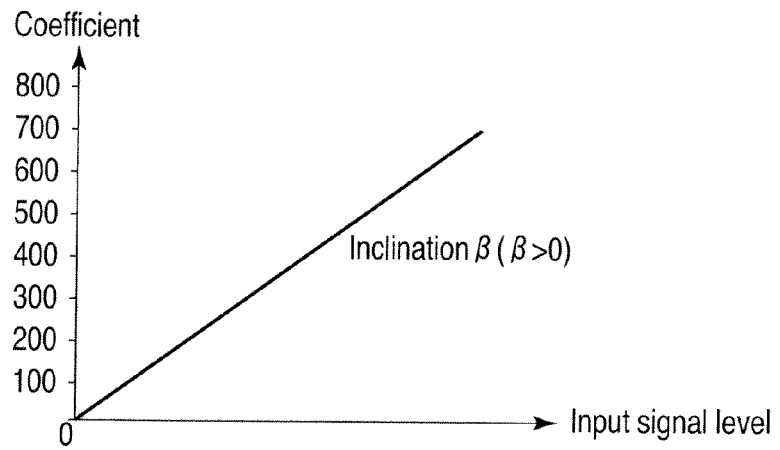
F I G. 4A
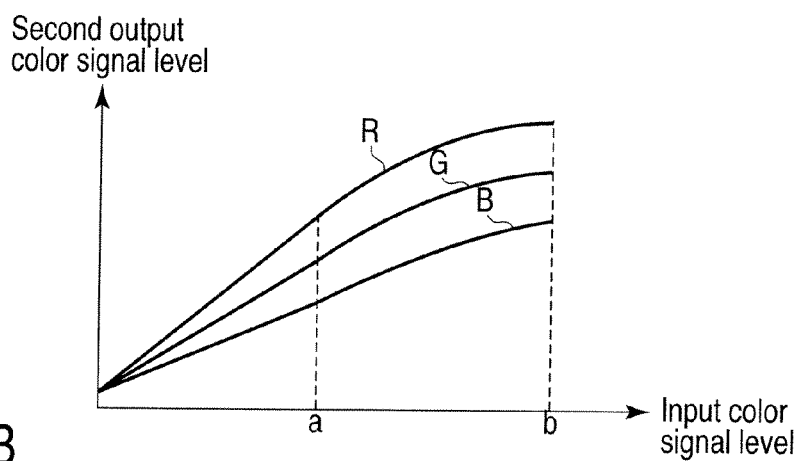
F I G. 4B
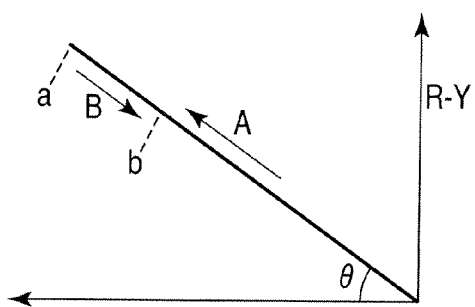
F I G. 4C

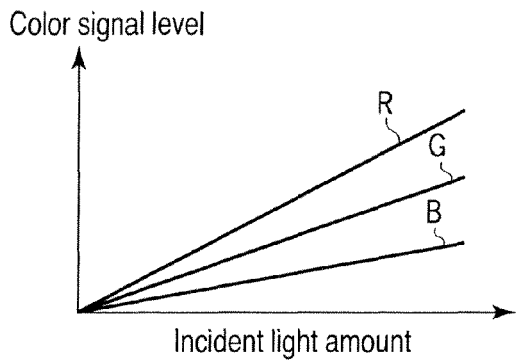
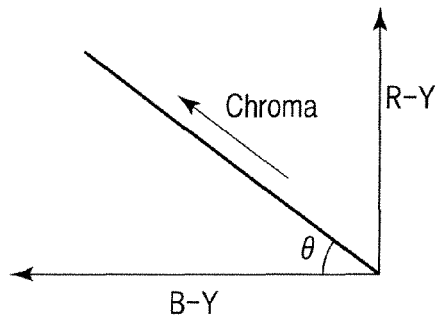
F I G. 5A          F I G. 5B
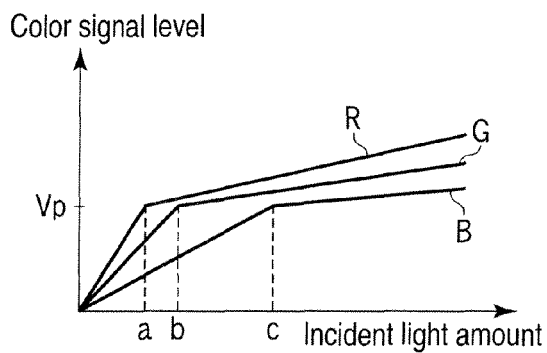
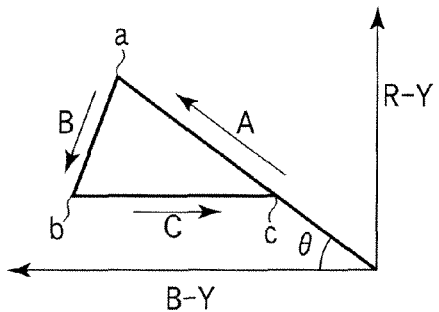
F I G. 5C          F I G. 5D
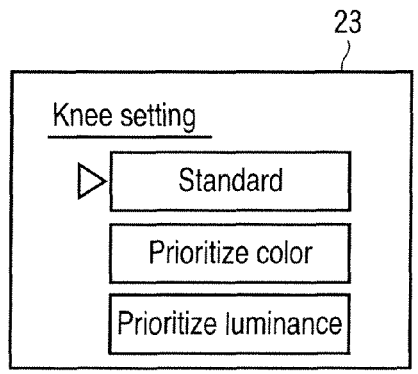
F I G. 6

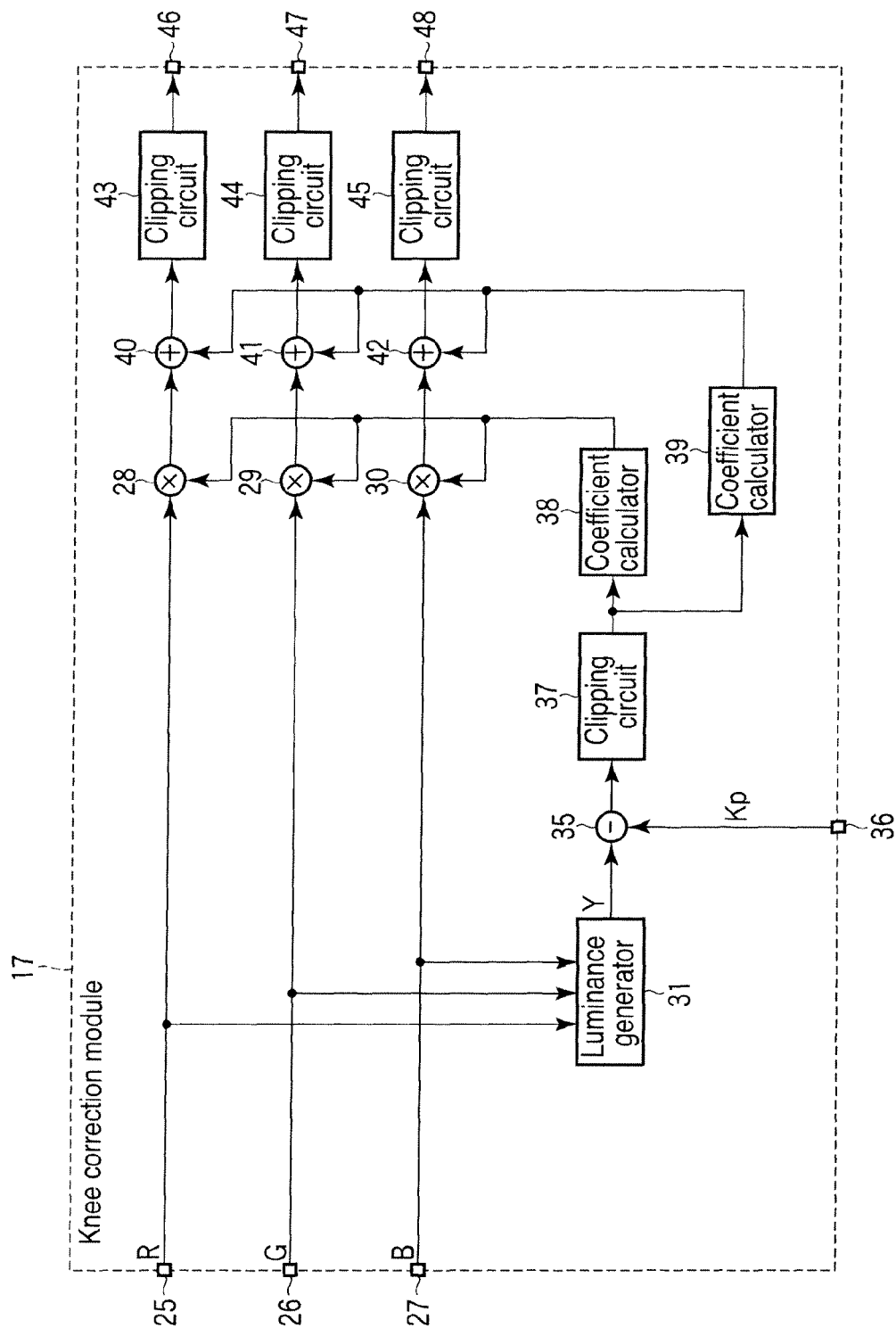
F I G. 9

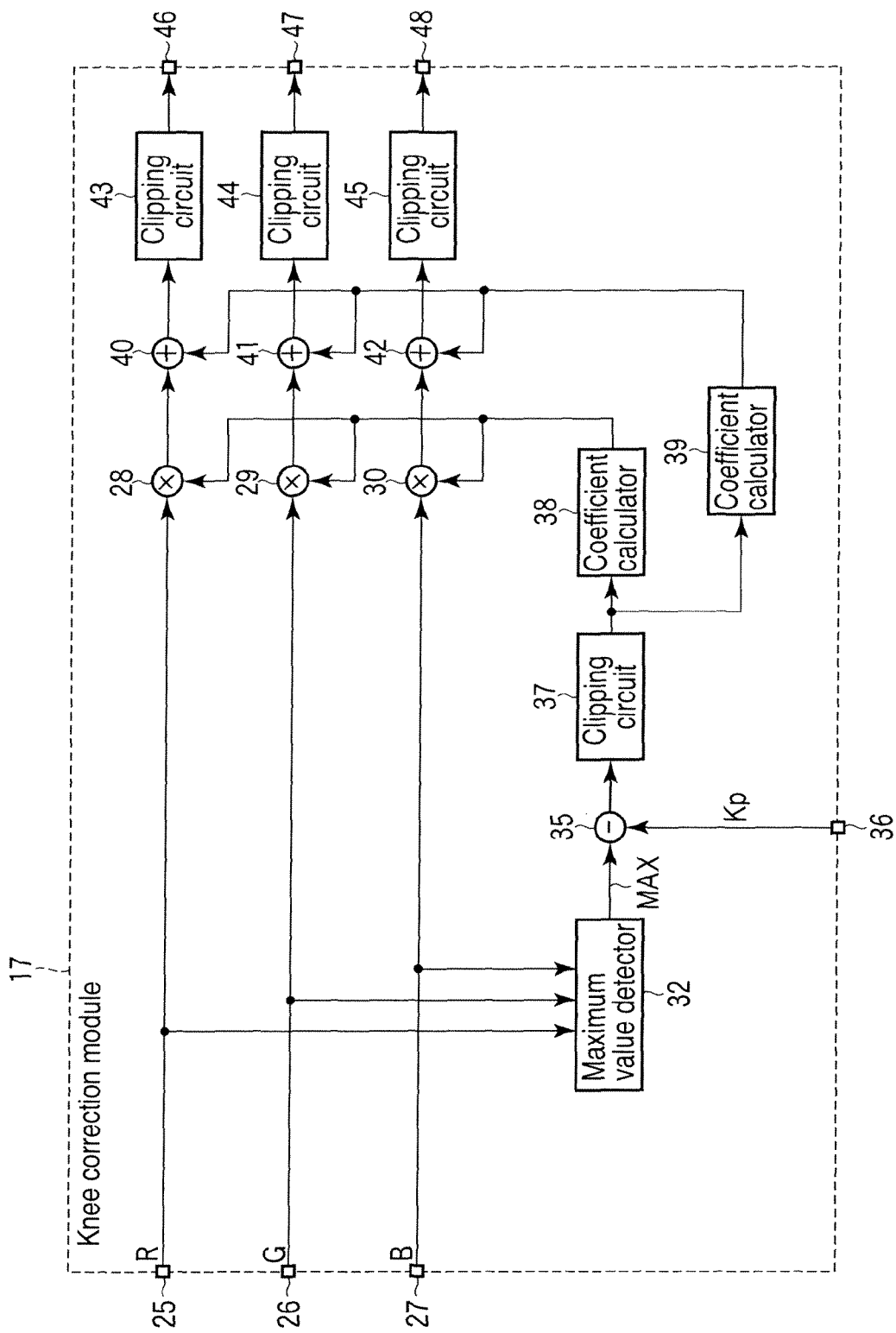
F I G. 10

US 8,446,496 B2

KNEE CORRECTION DEVICE AND KNEE CORRECTION METHOD

CROSS-REFERENCE TO RELATED APPLICATIONS

This application is based upon and claims the benefit of priority from Japanese Patent Application No. 2010-125128, filed May 31, 2010; the entire contents of which are incorporated herein by reference.

FIELD

Embodiments described herein relate generally to a knee correction device and a knee correction method by which level compression is performed on high luminance components of a video signal obtained from an imaging element in an imaging device.

BACKGROUND

As is well-known, for example, in an imaging device such as a digital still camera or a digital video camera, an optical image of an imaged object is converted into an electric video signal by focusing the optical image on an imaging element. The video signal is subjected to various kinds of signal processing, and is then output externally or recorded on a recording medium.

In this case, a level range of a video signal which is output from the imaging device is defined to be narrower than a level range of a video signal obtained from an imaging element, according to standards. Therefore, the imaging device is configured to perform a knee correction processing by which high luminance components of a video signal obtained from the imaging element are subjected to level compression in order to set the level range of the output video signal within a standard.

Meanwhile, a knee correction processing technique as described above is still under development, and there still remain various points to be improved for practical use. For example, when a chromatic color is imaged according to a conventional knee correction processing technique, hue of high luminance components of a video signal is not correctly reproduced by a level compression processing but causes hue rotation, as is known.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIG. 1 is a block diagram for schematically describing an example of a signal processing system in an imaging device according to an embodiment;

FIG. 2 is a block diagram for schematically describing an example of a knee correction module comprised in the imaging device according to the embodiment;

FIG. 4A, FIG. 4B, and FIG. 4C are graphs each of which represents an example of a main processing operation of the knee correction module comprised in the imaging device according to the embodiment;

FIG. 5A, FIG. 5B, FIG. 5C, and FIG. 5D are graphs each of which represents an example of a processing operation which is performed according to a conventional knee correction module;

FIG. 6 is a block diagram for describing an example of a knee setting screen displayed by the imaging device according to the embodiment;

FIG. 9 is a block diagram for schematically describing still another example of the knee correction module comprised in the imaging device according to the embodiment; and FIG. 10 is a block diagram for schematically describing still another example of the knee correction module comprised in the imaging device according to the embodiment.

DETAILED DESCRIPTION

Figure 3A:
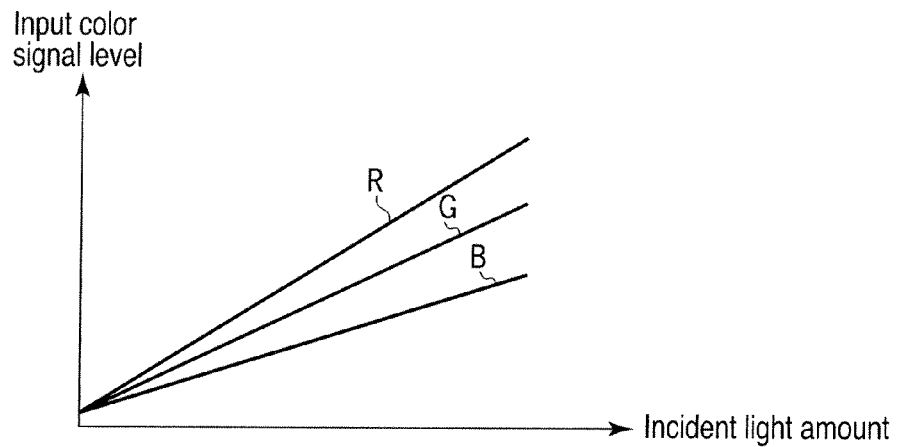
FIG. 3A, FIG. 3B, and FIG. 3C are graphs each of which represents an example of a main processing operation of the knee correction module comprised in the imaging device according to the embodiment.

Various embodiments will be described hereinafter with reference to the accompanying drawings. In general, according to one embodiment, a knee correction device comprises a generator, a detector, a mixer, and a supply module. The generator generates a luminance signal from R, G, and B color signals. The detector detects a color signal having a maximum value among the R, G, and B color signals. The mixer mixes the luminance signal generated by the generator with the color signals detected by the detector, at a predetermined mixing ratio. The supply module supplies a coefficient for performing level compression on each of R, G, and B color signals, based on an output from the mixer. The calculator performs level compression on the R, G, and B color signals supplied from the supply module, by a calculation between the coefficients supplied by the supply module and the R, G, and B color signals.

FIG. 1 schematically represents a signal processing system of an imaging device 11 which will now be described in the present embodiment. That is, the optical image of the object which is incident through an imaging lens 12 is supplied to an imaging module 13 and is converted into red (R), green (G), and blue (B) color signals.

Used as the imaging module 13 is an imaging element of a so-called three-plate type in which incident light from the imaging lens 12 is separated into respective color components. Light of each of the separated color components is imaged on an imaging element. Alternatively, the imaging element may be of a so-called single-plate type in which color signals R, G, and B are generated by using one imaging element.

Further, color signals R, G, and B output from the imaging module 13 are supplied to the analog-to-digital converter 14 and are thereby digitized. Thereafter, the color signals are supplied to a signal processing large-scale integrated circuit (LSI) 15. This signal processing LSI 15 performs a gain control, a white balance control, a subtraction processing, and a subtraction processing for a black level by a gain/white balance controller 16.

Further, color signals R, G, and B, on which the gain control and white balance control have been performed and from which the black level has been subtracted, are subjected to a knee correction processing by the knee correction module 17, a gamma correction processing by a gamma correction processing module 18, as well as various kinds of signal processing by a video signal processing module 19. Thereafter, color signals R, G, and B are output to outside through an output terminal 20.

Here, the imaging device 11 totally controls all operations including an imaging operation as described above by a controller 21. The controller 21 includes a central processing unit (CPU) 21a, receives operation information from an operation module 22 provided in a body of an imaging device 11, and controls respective modules so as to reflect content of the operation.

In this case, the controller 21 utilizes the memory module 21b. The memory module 21b comprises, mainly, a read-only memory (ROM) which stores a control program to be executed by the CPU 21a, a random access memory (RAM) for providing the CPU 21a with a work area, and a non-volatile memory where various setting information and control information are stored.

Further, the controller 21 is connected to a display module 23. The display module 23 displays imaged videos, based on the user's operations by means of the operation module 22, and further displays operation states of the imaging device 11 and states of respective modules. Further, the display module 23 displays a menu screen which presents plural choices, based on the user's operations by means of the operation module 22. The user makes a desired choice from the menu screen by operating the operation module 22. The user can thereby set the imaging device 11 in a desired state.

Further, a recording/reproduction module 24 is connected to the controller 21. The recording/reproduction module 24 records/reproduces an imaged video signal, based on the user's operations by means of the operation module 22, and a reproduced video signal can be led to outside through an output terminal 20 or can be displayed on the display module 23.

The recording/reproduction module 24 may be, for example, a hard disk drive (HDD) or a drive device which can record/reproduce data on/from an attached optical disk such as a Digital Versatile Disk (DVD), or a portable recording medium, such as a memory card.

FIG. 2 represents an example of the knee correction module 17 described above. That is, the knee correction module 17 comprises input terminals 25, 26, and 27 supplied with the respectively corresponding color signals R, G, and B which are output from the gain/white balance controller 16. Further, color signals R, G, and B supplied to the input terminals 25 to 27 are supplied to respectively corresponding ones of input terminals of the multiplication circuits 28, 29, and 30.

Further, color signals R, G, and B supplied to these input terminals 25 to 27 are further supplied to the luminance generator 31. The luminance generator 31 generates a luminance signal Y from the input color signals R, G, and B. For example, for a high-definition signal, the luminance generator 31 generates a luminance signal Y by performing a calculation of Y=0.2126R+0.7152G+0.0722B.

Further, color signals R, G, and B are supplied to a maximum value detector 32 supplied to the input terminals 25 to 27. The maximum value detector 32 detects a color signal MAX which has a maximum level from among the input color signals R, G, and B.

Further, the luminance signal Y generated by the luminance generator 31 and color signal MAX detected by the maximum value detector 32 are supplied to the mixer 33. The mixer 33 mixes the luminance signal Y and color signal MAX at a mixing ratio specified by a mixing ratio control signal supplied from the controller 21 through the input terminal 34.

For example, when the mixing ratio between the luminance signal Y and color signal MAX is 1:3, an output signal of the mixer 33 is (Y+MAX×3)÷4.

Thereafter, the output signal from the mixer 33 is supplied to a subtraction circuit 35, and knee points Kp supplied from the controller 21 through the input terminal 36 are subjected to level subtraction. The knee points Kp are levels for determining whether or not the knee correction module 17 performs the knee correction processing described later on color signals R, G, and B supplied to the input terminals 25 to 27, i.e., level compression on high luminance components.

That is, when an output signal level of the mixer 33 is less than or equal to a level of the knee points Kp, i.e., when a subtraction result of the subtraction circuit 35 is zero or negative, the knee correction processing is not performed. However, when the output signal level of the mixer 33 exceeds the level of knee points Kp, i.e., when a subtraction result of the subtraction circuit 35 is positive, the knee correction processing is performed.

Specifically, the subtraction result of the subtraction circuit 35 is supplied to the clipping circuit 37. The clipping circuit 37 outputs zero when the subtraction result from the subtraction circuit 35 is zero or negative. Alternatively, the clipping circuit 37 outputs directly the subtraction result when the subtraction result from the subtraction circuit 35 is positive.

Further, the outputs from the clipping circuit 37 are supplied respectively to two coefficient calculators 38 and 39. Where the output from the clipping circuit 37 is x, the coefficient calculator 38 of the foregoing two calculates a coefficient, based on a function $f1(x)$ which takes unity when x=0 or takes a positive value not greater than unity but corresponding to a value of x when x>0. The coefficient calculator 38 then supplies the coefficient to the multiplication circuits 28 to 30 described above.

The multiplication circuits 28 to 30 respectively multiply color signals R, G, and B supplied to the input terminals 25 to 27, by the coefficient output from the coefficient calculator 38, and output multiplication results thereof to respectively corresponding addition circuits 40, 41, and 42.

Where the output from the clipping circuit 37 is x, the coefficient calculator 39 calculates a coefficient, based on a function $f2(x)$ which takes zero when x=0 or takes a positive value not greater than unity when x>0 but corresponding to the value of x at that time. The coefficient calculator 39 supplies the coefficient to the addition circuits 40 to 42.

Therefore, when the output from the clipping circuit 37 is zero, i.e., when an output signal level from the mixer 33 is not greater than a level of the knee points Kp, the unity coefficient is output from the coefficient calculator 38. Therefore, the multiplication circuits 28 to 30 directly output color signals R, G, and B as input.

Further, when the output from the clipping circuit 37 is zero, i.e., when an output signal level from the mixer 33 is not greater than a level of the knee points Kp, the coefficient of zero is output from the coefficient calculator 39. Therefore, the multiplication circuits 40 to 42 directly output color signals R, G, and B as input.

That is, when the output from the clipping circuit 37 is zero, i.e., when the output signal level of the mixer 33 is not greater than the level of the knee points Kp, color signals R, G, and B are supplied from the addition circuits 40 to 42 to the input terminals 25 to 27 and are directly output. Color signals R, G, and B are extracted from the output terminals 46, 47, and 48 through clipping circuits 43, 44, and 45 which respectively clip levels for the respective color signals R, G, and B. Thus, the knee correction processing is not performed.

On the other side, when the output from the clipping circuit 37 is positive, i.e., when the output signal level of the mixer 33 exceeds the level of the knee points Kp, the multiplication circuits 28 to 30 multiply color signals R, G, and B by the positive coefficient output from the coefficient calculator 38. The multiplied color signals R, G, and B are added with the positive coefficient output from the addition circuits 40 to 42. Therefore, the knee correction processing is performed.

Next, a specific example of the knee correction processing for color signals R, G, and B will be described. FIG. 3A represents a relationship between an incident light amount from the imaging lens 12 and levels of color signals R, G, and B (input color signals) supplied to the input terminals 25 to 27. Levels of the input color signals R, G, and B linearly change, depending on the incident light amount. For an equal incident light amount, the levels are set in the order of R>G>B.

Figure 3B:
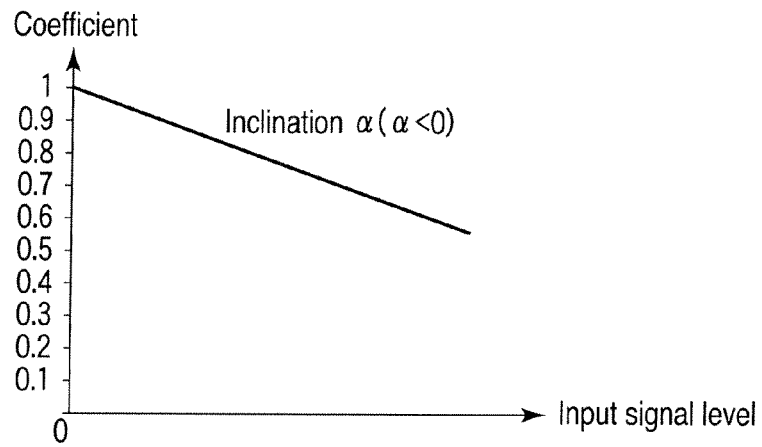

Further, FIG. 3B represents a relationship between the input signal levels and the output coefficient in the coefficient calculator 38. Represented here is a linear characteristic with a negative inclination α as follows. When an input signal level or namely an output level of the clipping circuit 37 is zero, the unity coefficient is output. As the input signal level increases from zero, an output coefficient gradually decreases from unity toward zero.

In other words, the coefficient calculator 38 calculates the coefficient, based on a linear function $f1(x)$ with a negative inclination a which has an input/output characteristic as follows. Where the output from the clipping circuit 37 is x, the coefficient takes unity when x=0. As x increases, the coefficient decreases from unity toward zero. The coefficient calculated by the coefficient calculator 38 is to derive modulation components for color signals R, G, and B. The multiplication circuits 28 to 30 multiply the input color signals R, G, and B by the coefficient, to control chroma amounts (color depths) of color signals R, G, and B.

Figure 3C:
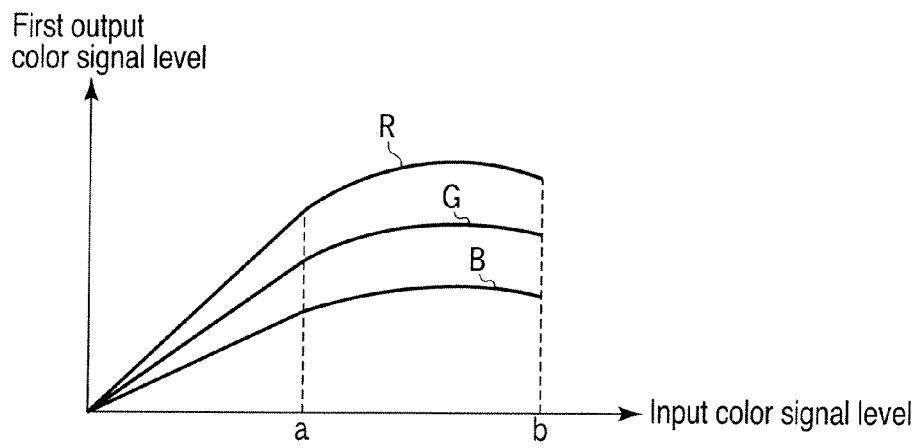

FIG. 3C represents a relationship between levels of color signals R, G, and B (input color signals) supplied to the input terminals 25 to 27 and levels of color signals (first output color signals) R, G, and B output from the multiplication circuits 28 to 30. That is, when the output signal level from the mixer 33 is not greater than the level of knee points Kp, i.e., when the levels of the input color signals R, G, and B are not greater than a, the input color signals R, G, and B are directly output as first output color signals R, G, and B from the multiplication circuits 28 to 30.

Otherwise, when the output signal level from the mixer 33 exceeds the level of knee points Kp, i.e., the levels of the input color signals R, G, and B exceed level a, signals obtained by multiplying the input color signals R, G, and B by the coefficient output from the coefficient calculator 38 are output as first output color signals R, G, and B from the multiplication circuits 28 to 30.

In this case, the levels of the first output color signals R, G, and B are controlled to have such a curved characteristic that, as levels of the input color signals R, G, and B increase, levels of the high luminance components are more compressed. Further, as the inclination α of the linear characteristic is decreased to be (steeper), level compression rates for the input color signals R, G, and B increase and enlarge color suppression amounts. However, when the levels of the input color signals R, G, and B exceed a predetermined level, for example, as denoted by level b in FIG. 3C, the levels of the first output color signals R, G, and B decrease inversely.

Next, FIG. 4A represents a relationship between the input signal levels and the output coefficient in the coefficient calculator 39. Represented here is a linear characteristic with a positive inclination β as follows. When an input signal level or namely an output level of the clipping circuit 37 is zero, the coefficient of zero is output. As the input signal level increases from zero, an output coefficient gradually increases from zero.

In other words, where the output from the clipping circuit 37 is x, the coefficient calculator 39 calculates the coefficient, based on a linear function $f2(x)$ with a positive inclination β, which has a linear input/output characteristic as follows. The coefficient is zero when x=0 or gradually increases in a positive direction as x increases. The coefficient calculated by the coefficient calculator 39 is to derive superposition components for the input color signals R, G, and B. The addition circuits 40 to 42 add the coefficient to the first output color signals R, G, and B output from the multiplication circuits 28 to 30, to control luminance levels of color signals R, G, and B.

FIG. 4B represents a relationship between levels of color signals R, G, and B supplied to the input terminals 25 to 27 and levels of color signals (second output color signals) R, G, and B output from the addition circuits 40 to 42. That is, when the output signal level from the mixer 33 is not greater than the level of knee points Kp, i.e., when the levels of the input color signals R, G, and B are not greater than a, the first output color signals R, G, and B from the multiplication circuits 28 to 30 are directly output as second output color signals R, G, and B from the addition circuits 40 to 42.

Otherwise, when the output signal level from the mixer 33 exceeds the level of knee points Kp, i.e., the levels of the input color signals R, G, and B exceed level a, signals obtained by adding the coefficient output from the coefficient calculator 39 to the first output color signals R, G, and B are output as second output color signals R, G, and B from the multiplication circuits 40 to 42.

In this case, the levels of the second output color signals R, G, and B are controlled to have such a characteristic that, as the levels of the input color signals R, G, and B increase, the levels of the high luminance components are raised higher. In this manner, if the levels of the input color signals R, G, and B are as denoted at level b in FIG. 4B, decreases in levels of the high luminance components of the second output color signals R, G, and B are corrected. As the inclination β of the linear characteristic represented in FIG. 4A is decreased (to be steeper), the level compression amounts for the first output color signals R, G, and B increase.

FIG. 4C represents a hue reproduction characteristic when the knee correction module 17 performs a level compression processing on high luminance components of the input color signals R, G, and B. Hue can be expressed by a relationship between an R-Y signal and a B-Y signal. Angle θ indicates the hue, and the length in the direction of arrow A indicates chroma (color depth).

When the levels of the input color signals R, G, and B gradually increase, chroma extends in the direction indicated by arrow A in an area until the levels of the input color signals R, G, and B reach a. In an area where the levels of the input color signals R, G, and B exceed a, chroma extends in the direction indicated by arrow B which is opposite to the direction indicated by arrow A.

In general, when the levels of color signals R, G, and B for the incident light amounts have characteristics as represented in FIG. 5A, the hue is expressed as one linear characteristic having a predetermined angle θ (hue) and a predetermined length (chroma) as represented in FIG. 5B unless level compression using the knee correction processing is performed on high luminance components of color signals R, G, and B.

In contrast, according to a conventional knee correction processing technique, level compression is performed when the levels of color signals R, G, and B for the incident light amount reach a preset predetermined reference level Vp as represented in FIG. 5C. In this case, variation characteristics of levels differ for each of color signals R, G, and B with respect to the incident light amount. Therefore, level compression is performed at first on color signal R because color signal R, which has the highest level increase rate when the incident light amount is a, reaches the reference level Vp. Thereafter, color signal G reaches the reference level Vp when the incident light amount is b, and is therefore subjected to level compression. When the incident light amount is c, color signal B reaches the reference level Vp and is therefore subjected to level compression.

Consideration will now be taken into a case that the incident light amount gradually increases. In an area until the incident light amount reaches a, level compression is not performed on any of color signals R, G, and B. Therefore, the hue has a linear characteristic with the original angle and original length as indicated by arrow A in FIG. 5D.

Further, in an area where the incident light amount is between a and b, only color signal R is subjected to level compression, and therefore, a ratio between the levels of the original color signals R, G, and B varies. Accordingly, the hue has a linear characteristic with the angle and length as indicated by arrow B in FIG. 5D.

Further, in an area where the incident light amount is between b and c, color signals R and G are subjected to level compression, and therefore, a ratio between the levels of the original color signals R, G, and B varies. Accordingly, the hue has a linear characteristic with the angle and length as indicated by arrow C in FIG. 5D, and hue rotation occurs.

Also according to the conventional knee correction processing technique, when levels of color signals R, G, and B are compressed, output characteristics of the levels of color signals R, G, and B become break points. Therefore, luminance and colors greatly change near the break points, and a displayed video becomes unnatural in some cases.

Meanwhile, the knee correction module 17 represented in FIG. 2 generates coefficients for controlling a chroma amount and a luminance level for the input color signals R, G, and B, based on a signal obtained by mixing the luminance signal Y generated from the input color signals R, G, and B with color signal MAX having a maximum level. The knee correction module 17 multiplies the input color signals R, G, and B by the coefficient for controlling the chroma amount, and adds the coefficient for controlling the luminance level to multiplication results thereof.

Therefore, level compression can be performed on the original color signals R, G, and B without varying ratios of levels of the original color signals R, G, and B to an incident light amount. Accordingly, hue rotation can be prevented. Further, when levels of color signals R, G, and B are compressed, output characteristics of the levels of color signals R, G, and B do not become break points. Therefore, luminance and colors are not caused to greatly vary but a natural video can be displayed.

In addition, various characteristics can be obtained by changing the mixing ratio between the luminance signal Y and color signal MAX having the maximum level or by changing the input/output characteristic in the coefficient calculators 38 and 39. For example, a characteristic of chroma suppression can be controlled by changing the mixing ratio between the luminance signal Y and color signal MAX having the maximum level.

That is, for a signal strongly expressing primary colors such as red and blue, a contribution ratio to the luminance signal Y is low, and therefore, MAX>>Y is given. Accordingly, as the mixing ratio of color signal MAX is increased, the level of the knee points Kp appears to drop, and level compression can then be strongly performed on color signals R, G, and B. Further, as the mixing ratio of the luminance signal Y is increased, the level of the knee points Kp appears to rise, and accordingly, level compression can be weakened for color signals R, G, and B. Normally, the mixing ratio between the luminance signal Y and color signal MAX having the maximum level is set to 1:1.

Further, as described above, a color suppression amount for a color can be increased by decreasing the inclination α of the input/output characteristic. A compression amount can be increased by decreasing the inclination β of the input/output characteristic of the coefficient calculator 39. Thus, a desired compression ratio can be achieved. The functions f1(x) and f2(x) described above are not limited to primary functions but may be complex operation expressions. Then, the knee correction processing can be performed at a higher degree of freedom.

Further, characteristics of the knee correction processing may be configured to be selected by the user. Such a configuration can be achieved by allowing the user to operate the operation module 22 to display a knee setting screen as illustrated in FIG. 6, on the display module 23. On the knee setting screen, three items "standard", "prioritize color", and "prioritize luminance" are displayed, and the user can select a characteristic of the knee correction processing by operating the operation module 22 to select and decide a desired item.

When the item "standard" is set, the mixing ratio between the luminance signal Y and color signal MAX having the maximum level is set to 1:1. Otherwise, when the item "prioritize color" is set, the mixing ratio between the luminance signal Y and color signal MAX having the maximum level is set to 1:2 which involves a characteristic that primary colors and strengths of colors are emphasized. Still otherwise, when the item "prioritize luminance" is set, the mixing ratio between the luminance signal Y and color signal MAX having the maximum level is set to 2:1 which involves a suitable characteristic for displaying a video with low chroma (light colors).

Figure 7:
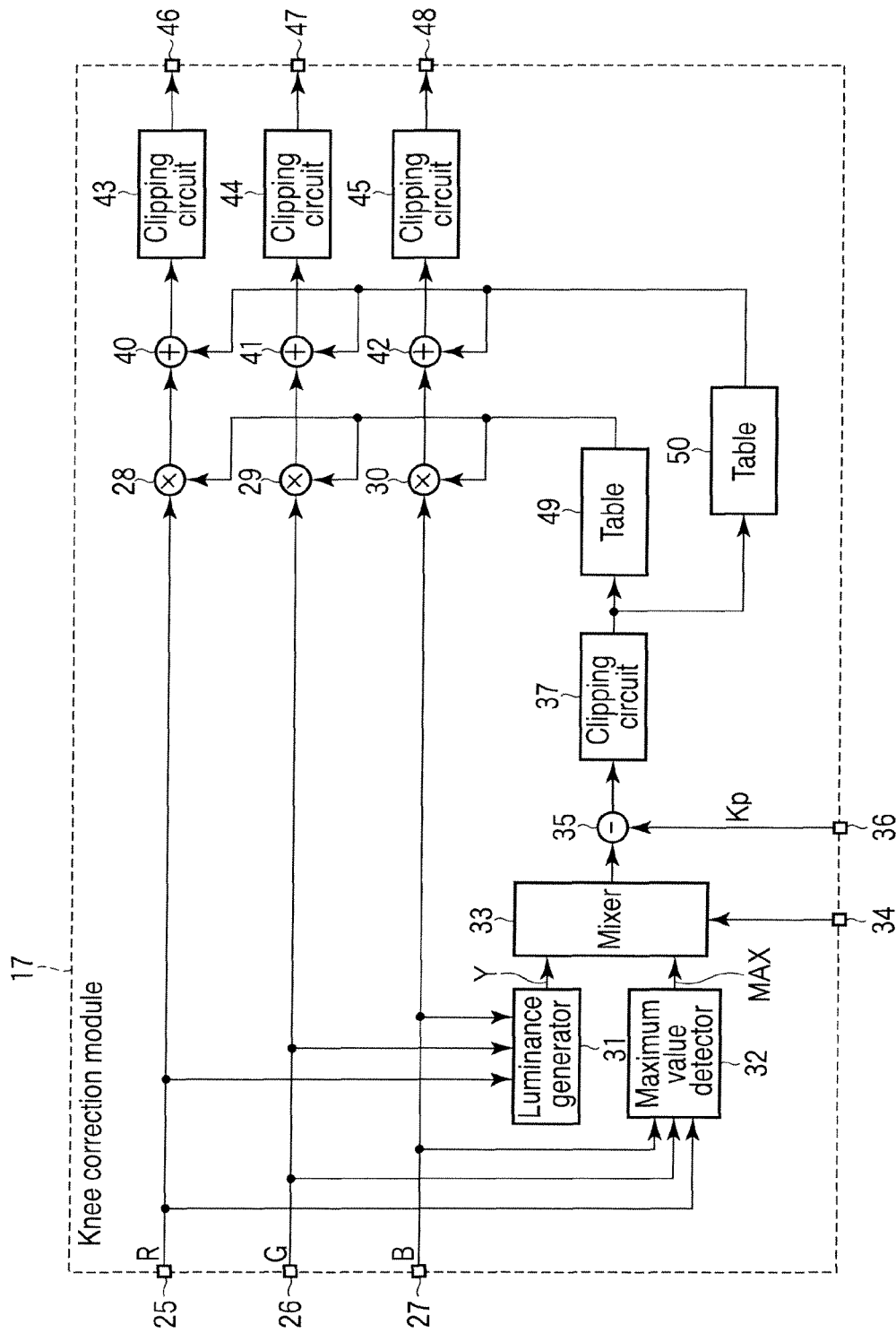
FIG. 7 is a block diagram for schematically describing another example of the knee correction module comprised in the imaging device according to the embodiment.

FIG. 7 represents a modification to the knee correction module 17 represented in FIG. 2. FIG. 7 will now be described by referring common parts to FIG. 2 at common reference symbols. A difference is that the coefficient calculators 38 and 39 are constituted by tables 49 and 50. Tables 49 and 50 each store coefficients for various input signal levels, and output coefficients respectively corresponding to levels of input signals.

Figure 8A:
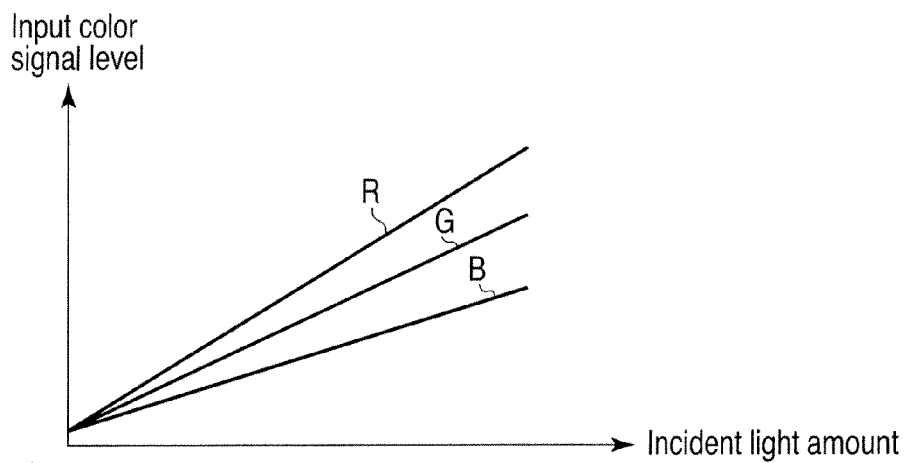
FIG. 8A, FIG. 8B, and FIG. 8C are graphs each of which represents another example of a main processing operation of the knee correction module comprised in the imaging device according to the embodiment.

Here, FIG. 8A represents a relationship between an incident light amount from the imaging lens 12 and levels of color signals R, G, and B (input color signals) supplied to the input terminals 25 to 27. Levels of the input color signals R, G, and B linearly change, depending on the incident light amount. For an equal incident light amount, the levels are set in the order of R>G>B.

Figure 8B:
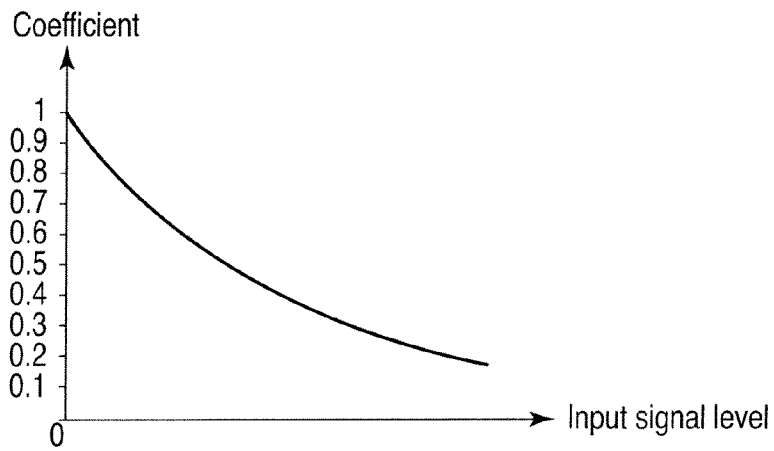

Further, FIG. 8B represents a relationship between the input signal levels and the output coefficient in the foregoing table 49. Represented here is a non-linear characteristic as follows. When an input signal level or namely an output level of the clipping circuit 37 is zero, the unity coefficient is output. As the input signal level increases from zero, an output coefficient gradually decreases from unity toward zero.

The table 50 represents a relationship between the input signal levels and the output coefficient, as represented in FIG. 4A. Represented here is a linear characteristic with a positive inclination β as follows. When an input signal level or namely an output level of the clipping circuit 37 is zero, the coefficient of zero is output. As the input signal level increases from zero, an output coefficient gradually increases from zero.

Figure 8C:
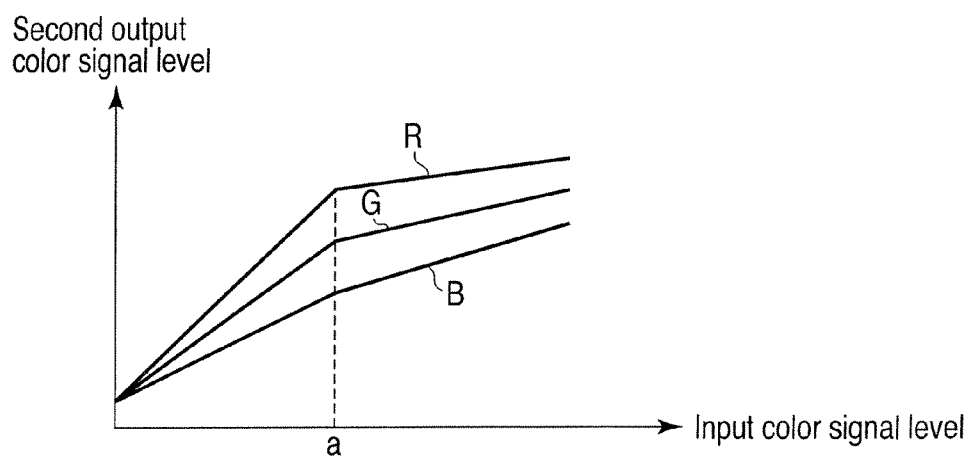

FIG. 8C represents a relationship between levels of color signals R, G, and B supplied to the input terminals 25 to 27 and levels of color signals (second output color signals) R, G, and B output from the addition circuits 40 to 42. That is, when the output signal level from the mixer 33 is not greater than the level of knee points Kp, i.e., when the levels of the input color signals R, G, and B are not greater than a, the output color signals R, G, and B are directly output as second output color signals R, G, and B from the addition circuits 40 to 42.

Otherwise, when the output signal level from the mixer 33 exceeds the level of knee points Kp, i.e., when the levels of the input color signals R, G, and B exceed level a, signals obtained by compressing levels of the input color signals R, G, and B at break points are output as second output color signals R, G, and B from the multiplication circuits 40 to 42.

The same effects as obtained by the knee correction module 17 represented in FIG. 2 can be obtained by the knee correction module 17 represented in FIG. 7. Further, characteristics of knee correction can be easily changed by rewriting the tables 49 and 50.

FIG. 9 and FIG. 10 represent a further modification of the knee correction module represented in FIG. 2. At first, FIG. 9 will be described with common parts to FIG. 2 referred to at common reference symbols. The maximum value detector 32 and the mixer 33 are deleted, and the luminance signal Y generated by the luminance generator 31 is directly supplied to the subtraction circuit 35. Further, FIG. 10 will be described with common parts to FIG. 2 referred to at common reference symbols. The luminance generator 31 and the mixer 33 are deleted, and color signal MAX detected by the maximum value detector 32 is directly supplied to the subtraction circuit 35. The modification represented in FIG. 9 and FIG. 10 relates to a simplified example which can be used when a mixing processing of mixing the luminance signal Y and color signal MAX having the maximum level is not required.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A knee correction device comprising:
   a generator configured to generate a luminance signal from R, G, and B color signals;
   a detector configured to detect a color signal having a maximum value among the R, G, and B color signals;
   a mixer configured to mix the luminance signal generated by the generator and the color signal detected by the detector, at a predetermined mixing ratio;
   a first supply module configured to supply, for an output of the mixer, a first coefficient for controlling a chroma amount for each of the R, G, and B color signals, based on a first input/output characteristic with a negative inclination;
   a first calculator configured to perform level compression on the R, G, and B color signals by subjecting the first coefficient supplied by the first supply module and each of the R, G, and B color signals to a calculation;
   a second supply module configured to supply, for the output of the mixer, a second coefficient for controlling a luminance level for each of the R, G, and B color signals, based on a second input/output characteristic with a positive inclination; and
   a second calculator configured to perform level control on the R, G, B color signals by subjecting the second coefficient supplied by the second supply module and each of output signals of the first calculator to a calculation.

2. The knee correction device of claim 1, wherein
   the first and second supply modules supply a coefficient with which the first and second calculators allow the R, G, and B color signals to pass without level control when the output of the mixer is at a level which corresponds to none of high luminance components of the R, G, and B color signals, or
   the first and second supply modules supply a coefficient with which the first and second calculators perform the level control on the R, G, and B color signals when the output of the mixer is at a level which corresponds to any of the high luminance components of the R, G, and B color signals.

3. The knee correction device of claim 1, wherein
   the first calculator multiplies the first coefficient supplied by the first supply module, by each of the R, G, and B color signals, and
   the second calculator adds the second coefficient supplied by the second supply module, to each of the output signals of the first calculator.

4. The knee correction device of claim 1, wherein
   the first or second supply module either generates a coefficient by performing a function calculation, based on the output of the mixer or obtains a coefficient from a table which associates the output of the mixer with the coefficient.

5. An imaging device comprising:
   an imaging module configured to convert an optical image of an object which is incident through an imaging lens, into R, G, and B color signals;
   a generator configured to generate a luminance signal from the R, G, and B color signals output from the imaging module;
   a detector configured to detect a color signal having a maximum value among the R, G, and B color signals output from the imaging module;
   a mixer configured to mix the luminance signal generated by the generator and the color signal detected by the detector, at a predetermined mixing ratio;
   a first supply module configured to supply, for an output of the mixer, a first coefficient for controlling a chroma amount for each of the R, G, and B color signals, based on a first input/output characteristic with a negative inclination;
   a first calculator configured to perform level compression on the R, G, and B color signals by subjecting the first coefficient supplied by the first supply module and each of the R, G, and B color signals to a calculation;
   a second supply module configured to supply, for the output of the mixer, a second coefficient for controlling a luminance level for each of the R, G, and B color signals, based on a second input/output characteristic with a positive inclination; and a second calculator configured to perform level control on the R, G, B color signals by subjecting the second coefficient supplied by the second supply module and each of output signals of the first calculator to a calculation.

6. A knee correction method comprising:

generating a luminance signal from R, G, and B color signals;

detecting a color signal having a maximum value among the R, G, and B color signals;

mixing the luminance signal and the color signal detected, at a predetermined mixing ratio;

supplying, for a mixed signal of the luminance signal and color signal, a first coefficient for controlling a chroma amount for each of the R, G, and B color signals, based on a first input/output characteristic with a negative inclination;

performing level compression on the R, G, and B color signals by subjecting the first coefficient and each of the R, G, and B color signals to a calculation;

supplying, for the mixed signal of the luminance signal and color signal, a second coefficient for controlling a luminance level for each of the R, G, and B color signals, based on a second input/output characteristic with a positive inclination; and performing level control on the R, G, and B color signals by subjecting the second coefficient and each of the R, G, and B color signals subjected to the calculation with the first coefficient.

* * * * *